United States Patent [19]
Draghetti

[11] Patent Number: 5,269,121
[45] Date of Patent: Dec. 14, 1993

[54] METHOD AND DEVICE FOR APPLYING SEALING STRIPS TO PACKAGES

[75] Inventor: Fiorenzo Draghetti, Via San Donino, Italy

[73] Assignee: G.D Societa' per Azioni, Italy

[21] Appl. No.: 795,053

[22] Filed: Nov. 20, 1991

[30] Foreign Application Priority Data

Dec. 3, 1990 [IT] Italy .................. 3759 A/90

[51] Int. Cl.⁵ .......................... B65B 61/00
[52] U.S. Cl. ........................ 53/415; 53/136.1;
53/136.4; 156/556; 156/566; 156/567; 156/568
[58] Field of Search ............. 53/135.1, 136.1, 136.3,
53/136.4, 137.2, 252, 415; 156/556, 566, 567,
568, 586, 228, 233, 234, 387.2, 389.1, 575

[56] References Cited

U.S. PATENT DOCUMENTS

| | | | |
|---|---|---|---|
| 1,200,227 | 10/1916 | Pantazi | 53/136.4 X |
| 2,982,065 | 5/1961 | Giles et al. | 53/136.1 X |
| 4,198,258 | 4/1980 | Glosmann | 53/136.1 X |
| 4,476,665 | 10/1984 | Oberdorf | 53/252 X |
| 4,607,477 | 8/1986 | Hinchcliffe et al. | 53/136.3 X |
| 4,620,891 | 11/1986 | Applegate et al. | 53/136.1 X |
| 4,817,779 | 4/1989 | Beck et al. | 53/252 X |
| 4,840,007 | 6/1989 | Focke et al. | 53/136.3 |
| 5,009,741 | 4/1991 | Focke et al. | 156/568 X |
| 5,052,544 | 10/1991 | Anderson | 53/252 X |

FOREIGN PATENT DOCUMENTS 1603954 2/1981 United Kingdom .

*Primary Examiner*—John Sipos
*Assistant Examiner*—Linda B. Johnson
*Attorney, Agent, or Firm*—Marshall, O'Toole, Gerstein, Murray & Borun

[57] ABSTRACT

A method and device for applying sealing strips to packages, whereby the strips are applied to the packages as these are transferred between respective transverse pockets on three conveyors traveling at the same speed and in the same direction, the first conveyor being a loop conveyor located between a feed conveyor and an output conveyor. The strips are supplied in such a position as to close the end of the pockets on the loop conveyor facing the feed conveyor, and the packages complete one full turn of the loop conveyor prior to being transferred on to the output conveyor.

16 Claims, 2 Drawing Sheets

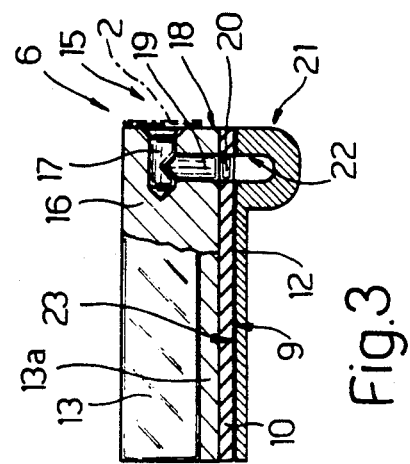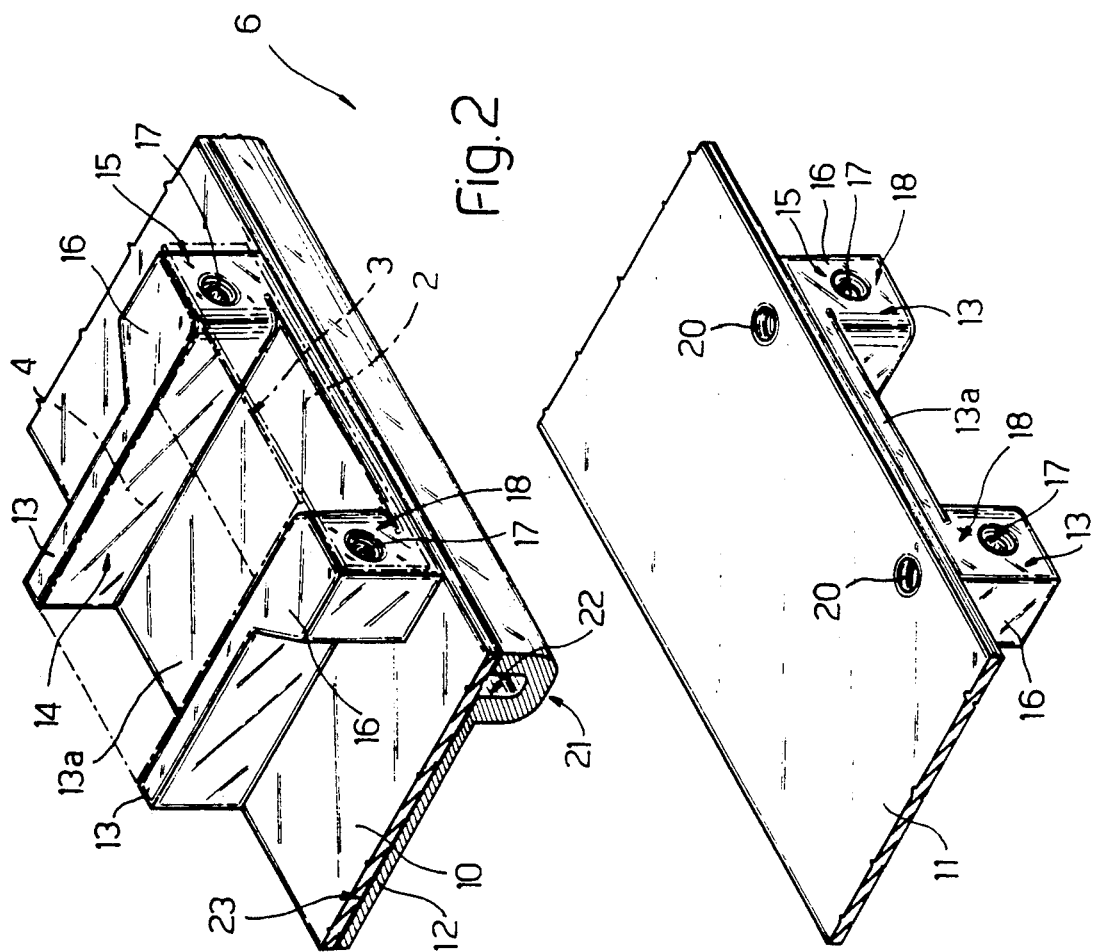

METHOD AND DEVICE FOR APPLYING SEALING STRIPS TO PACKAGES

BACKGROUND OF THE INVENTION

The present invention relates to a method of applying sealing strips to packages.

In particular, the present invention relates to a method of applying to a package substantially in the form of a rectangular parallelepipedon, such as a packet of cigarettes, a so-called "banderole" strip, i.e. a strip applied to and parallel to the longer axis of a base of the package, and longer than the base so as to present two opposite end portions which are folded over on to the lateral faces of the package adjacent to the base. Strips of the aforementioned type are usually applied by feeding the packages successively inside a duct over the inlet of which the strips are fed successively. Thus, as each package is inserted inside the duct, the width of which is substantially the same as that of the package, a strip is folded in a U about the front end of the package where it adheres to the front base and adjacent lateral surfaces of the same.

The packages inserted inside the duct are pushed forward, by those inserted behind, to the outlet end of the duct, which thus also provides for drying the strips. These, in fact, are maintained contacting the base and lateral surfaces of the packages for as long as they remain inside the duct.

The above method presents a number of drawbacks, mainly due to the fact that, as the strips are dried, the packages traveling along the drying duct rub against the walls of the duct, and in direct contact with the ends of the adjacent packages.

Such rubbing and end contact may result in slippage of the strips, as yet not perfectly dry, and in the ends of the packages adhering to each other.

SUMMARY OF THE INVENTION

It is an object of the present invention to provide a method of applying sealing strips to packages, designed to overcome the above drawbacks.

According to the present invention, there is provided a method of applying sealing strips to packages, characterised by the fact that said strips are applied to said packages as these are transferred between respective transverse pockets of a feed conveyor, a loop conveyor and an output conveyor, arranged at least partially side by side and traveling at the same speed and in the same direction; said loop conveyor being located between the other two; each said strip being fed, via supply means, to respective strip-holder means integral with said loop conveyor and supporting said strip in such a position as to close one end of a respective said pocket, on said loop conveyor, facing said feed conveyor; said strip being applied to said package as this is transferred, transversely in relation to said direction and by virtue of push means, between respective pockets on said feed conveyor and said loop conveyor; each said package completing one full turn of said loop conveyor prior to being transferred on to said output conveyor.

The above method clearly provides for eliminating end contact of the packages, and for drying the strips, with no rubbing, while the packages are housed in a fixed position inside the respective pockets on the loop conveyor, and in the time taken for the packages to complete one full turn of the loop conveyor prior to being transferred on to the output conveyor.

The present invention also relates to a device for applying sealing strips to packages.

According to the present invention, there is provided a device for applying sealing strips to packages, characterised by the fact that it comprises a feed conveyor, a loop conveyor and an output conveyor, arranged at least partially side by side and traveling at the same speed and in the same direction, said loop conveyor being located between the other two; a number of pockets on each said conveyor, arranged transversely in relation to said direction, and each designed to receive a respective said package, each said pocket being aligned with respective pockets on the other two conveyors; strip-holder means connected to each said pocket on said loop conveyor, for supporting a respective said strip in such a position as to close one end of a respective said pocket facing said feed conveyor; supply means for feeding said strips successively to said strip-holder means; and push means for successively transferring each said package, transversely in relation to said direction, from one said pocket on said feed conveyor to a respective said pocket on said loop conveyor, and from said pocket on said loop conveyor to a respective said pocket on said output conveyor.

BRIEF DESCRIPTION OF THE DRAWINGS

A non-limiting embodiment of the present invention will be described by way of example with reference to the accompanying drawings, in which:

FIG. 2 shows a larger-scale view in perspective of a detail in FIG. 1;

FIG. 3 shows a section along line III—III in FIG. 1.

DETAILED DESCRIPTION OF THE INVENTION

Figure 1:
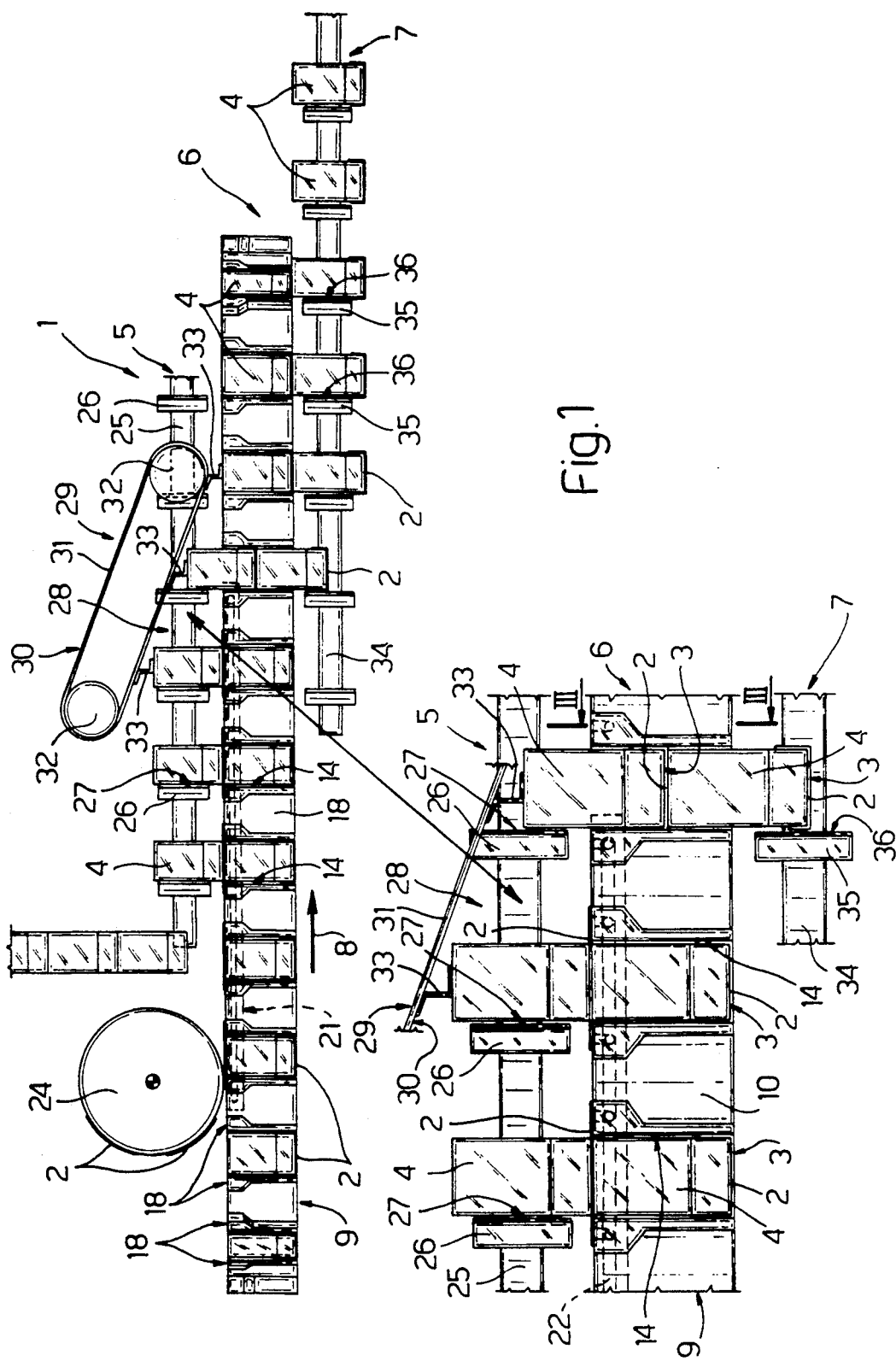
FIG. 1 shows a schematic plan view of a preferred embodiment of the device according to the present invention.

Number 1 in FIG. 1 indicates a device for applying sealing strips 2, in particular "banderole" strips, to a substantially rectangular end surface 3 of packages 4, in particular packets of cigarettes.

Device 1 comprises a feed conveyor 5, an intermediate conveyor 6 and an output conveyor 7, arranged side by side and traveling at the same speed and in the same direction as indicated by arrow 8.

As shown in FIGS. 1 to 3, intermediate conveyor 6 is a loop conveyor comprising a belt 9 having a top branch 10 and a bottom branch 11 parallel to each other and to the FIG. 1 plane. Belt 9 is driven continuously and at preferably constant speed by two end pulleys (not shown), at least one of which is powered, so as to move top branch 10 in the direction of arrow 8 and in contact with the upper surface of a supporting plate 12 between said two pulleys.

As shown particularly in FIGS. 2 and 3, belt 9 is fitted with a number of integral plates 13a having pairs of transverse ribs 13 defining, together with respective plates 13a, a number of pockets 14 open at opposite ends and arranged transversely in relation to arrow 8. The width of each pocket 14, in the direction of arrow 8, is substantially equal to that of package 4, and the end of each pocket 14 facing feed conveyor 5 presents a suction device 15 for retaining a respective strip 2 parallel to arrow 8 and perpendicular to the FIG. 1 plane, and in such a position as to close the end of pocket 14 facing feed conveyor 5.

For each rib 13, suction device 15 comprises a block 16 outside respective pocket 14 and integral with the end of rib 13 facing feed conveyor 5. As shown in FIG. 3, each block 16 presents a hole 17 parallel to the FIG. 1 plane and to respective rib 13. A first end of hole 17 terminates outwards at a surface 18 of block 16 facing feed conveyor 5, while a second end of hole 17 is connected to a hole 19 formed inwards through block 16 and perpendicular to the FIG. 1 plane. The inner end of hole 19 communicates, via a hole 20 through belt 9, with a suction system 21 comprising a groove 22 connected to a suction pump (not shown) and formed in plate 12 along a surface 23 contacting top branch 10 of belt 9.

As shown in FIG. 1, the initial portion of top branch 10 of belt 9 is connected laterally to a wheel 24 tangent to the path of surfaces 18 as branch 10 travels in the direction of arrow 8, and rotating about an axis (not shown) perpendicular to the FIG. 1 plane, so as to successively feed strips 2 to loop or intermediate conveyor 6 in such a manner that the opposite end portions of each strip 2 contact the two surfaces 18 (FIG. 2) of a respective suction device 15, thus closing the end of pocket 14 facing feed conveyor 5.

Feed conveyor 5 extends along a portion of top branch 10 of loop or intermediate conveyor 6 downstream from wheels 24 in the direction of arrow 8, and comprises a belt element 25 parallel to belt 9 and having a number of transverse projections 26, each substantially coplanar with rear rib 13 of respective pocket 14. Each pair of adjacent projections 26 defines a pocket 27, the rear portion of which, housing package 4, is aligned with a respective pocket 14.

The front portion of feed conveyor 5 extends inside a transfer station 28 which, in the FIG. 1 example, normally extends over three successive pockets 14 and three respective pockets 27. Along transfer station 28, there extends a cam-operated push device indicated as a whole by 29 and designed to gradually engage pockets 27 on feed conveyor 5, as they enter transfer station 28 in the direction of arrow 8, and to push packages 4 gradually into respective pocket 14 on loop or intermediate conveyor 6.

In the example shown, push device 29 comprises a push conveyor 30 arranged obliquely in relation to and partially over feed conveyor 5. Push conveyor 30 comprises a looped belt 31 moving about two pulleys 32 perpendicular to the FIG. 1 plane, and having a number of brackets 33 extending outwards and downwards, and each gradually engaging a respective pocket 27 in station 28. In particular, the angle of belt 31 in relation to feed conveyor 5 and the speed of belt 31 are such that each bracket 33 travels, crosswise in relation to arrow 8, along the whole of each pocket 27 on feed conveyor 5, in the time taken by pocket 27 to travel through transfer station 28. Finally, output conveyor 7 is located along a portion of top branch 10 of loop of intermediate conveyor 6 extending from station 28 in the direction of arrow 8, and comprises a belt element 34 parallel to belt 9 and having a number of transverse projections 35, each substantially coplanar with rear rib 13 of respective pocket 14. Each pair of adjacent projections 35 defines a pocket 36, the rear portion of which, housing package 4, is aligned with a respective pocket 14.

In actual use, the packages 4 fed into pockets 27 on feed conveyor 5, by means of a known feed device (not shown), are fed on conveyor 5 to station 28. At the same time, wheel 24 successively feeds strips 2 on to suction devices 15 of pockets 14 on loop or intermediate conveyor 6, so that strips 2, arranged with the gummed surface facing feed conveyor 5, close the end of a respective pocket 14 facing feed conveyor 5.

Packages 4 on feed conveyor 5 are pushed forward by respective projections 26 to station 28, where they are engaged by respective brackets 33 on push conveyor 30 and gradually pushed out of pocket 27 and into a respective pocket 14. As each packet 4 is transferred, end surface 3 contacts the gummed surface of a respective strip 2, which is drawn inside respective pocket 14 and folded in a U about package 4. Obviously, as each package 4 is fed gradually inside pocket 14, the package 4 already inside pocket 14 is pushed out into a respective pocket 36 from which it is unloaded by known unloading means (not shown).

Once inserted inside pocket 14 together with respective strip 2, each package 4 remains stationary inside pocket 14 for a drying time equal to that taken by belt 9 to complete one full turn, after which package 4 is fed back to station 28 and transferred on to output conveyor 7 as already described.

I claim:
1. A method for applying sealing strips to packages, comprising the steps of:
   feeding a first package into a respective first transverse pocket of a first conveyor;
   advancing said first package by said first conveyor to a transfer station where said first transverse pocket is aligned with a respective second transverse pocket of a second conveyor and also aligned with a respective third transverse pocket of a third conveyor;
   the second conveyor being a loop conveyor arranged at least at the transfer station between the first and third conveyors;
   feeding a sealing strip to the second conveyor to close one end of said second pocket facing the first conveyor;
   pushing said first package out of said first pocket of the first conveyor and into said second pocket of the second conveyor together with said sealing strip by cam means arranged at said transfer station;
   returning said second pocket to said transfer station by advancing the second conveyor one full turn;
   feeding a further sealing strip to said end of said second pocket;
   feeding a further package into a further first pocket and to said transfer station; and
   pushing said first package and the relevant sealing strip out of said second pocket and into said respective third transverse pocket by pushing said further package and said further sealing strip into said second pocket by means of said cam means.

2. A method according to claim 1 wherein said first, second and third pockets are advanced through said transfer station at the same substantially constant speed and in the same traveling direction.

3. A method according to claim 2 in which:
   at least at the transfer station the second conveyor is arranged between and parallel to the first conveyor (5) and the third conveyor (7).

4. A method according to claim 1 including:
   transferring said further package in said pocket on said first conveyor to a respective said second pocket on said second conveyor by pushing on an end of the further package opposite an end of the further package facing the second conveyor.

5. A method according to claim 1 in which the first, second and third conveyors are separate independent continuously moving conveyors.

6. A method for applying sealing strips to packages, comprising the steps of:
- feeding a first package into a respective first transverse pocket (27) of a feed conveyor (5);
- advancing said first package by said feed conveyor to a transfer station where said first transverse pocket (27) is aligned with a respective second transverse pocket (14) of a loop conveyor (6) and also aligned with a respective transverse pocket (36) of an output conveyor (7);
- the loop conveyor (6) being arranged at least at the transfer station between and parallel to the feed conveyor (5) and the output conveyor (7);
- feeding a sealing strip (2) to the loop conveyor (6) to close one end of said second pocket (14) facing the feed conveyor;
- pushing said first package out of said first pocket (27) of the feed conveyor and into said second pocket (14) of the loop conveyor together with said sealing strip (2) by cam means arranged at said transfer station;
- returning said second pocket (14) to said transfer station by advancing the loop conveyor one full turn;
- feeding a further sealing strip (2) to said end of said second pocket (14);
- feeding a further package (4) into a further first pocket (14) and to said transfer station; and
- pushing said first package (4) and the relevant sealing strip (2) out of said second pocket (14) and into said respective third transverse pocket (36) by pushing said further package (4) and said further sealing strip (2) into said second pocket (14) by means of said cam means.

7. A device (1) for applying sealing strips (2) to packages (4) comprising:
- a feed conveyor (5), a loop conveyor (6) and an output conveyor (7), arranged at least partially side by side at a transfer station and adapted to travel at the same speed and in the same direction (8);
- the loop conveyor (6) being located between the feed conveyor (5) and the output conveyor (7);
- the feed conveyor (5) having a number of spaced apart first pockets (27) arranged transversely in relation to said direction (8), each first pocket (7) being designed to receive a respective said package (4);
- the loop conveyor (6) having a number of spaced apart second pockets (14) arranged transversely in relation to said direction (8), each second pocket (14) being designed to receive a respective said package (4);
- the output conveyor (7) having a number of spaced apart third pockets (36) arranged transversely in relation to said direction (8), each third pocket (36) being designed to receive a respective said package (4);
- each said second pocket (14) on the loop conveyor (6) being aligned at the transfer station with a said first pocket (27) on the feed conveyor;
- each said second pocket (14) on the loop conveyor (6) being aligned at the transfer station with a said third pocket (36) on the output conveyor;
- each second pocket (14) on said loop conveyor (6) having a strip-holder means (16, 21) for holding a strip (2) in position to temporarily close an end of a respective second pocket (14) facing the feed conveyor (5);
- supply means (24) for feeding a strip (2) successively to each strip-holder means (16, 21); and
- cam push means (29) for successively transferring a package (4) at the transfer station, transversely in relation to the direction (8), from a first pocket (27) on the feed conveyor (5) into sealing contact with a strip (2) held across the respective loop conveyor (6) second pocket (14) and into effective pushing pressure with a sealed package (4) previously positioned therein, and for simultaneously and successively pushing the previously positioned respective package (4) from a second pocket (14) on the loop conveyor (6) to a respective third pocket (36) on the output conveyor (7).

8. A device according to claim 7 in which:
- each said first, second, and third pocket (27, 14, 36) comprises two wall means (26, 13, 35), arranged transversely in relation to said direction (8), and open at its opposite lateral ends; said strip-holder means (16, 21) comprising a suction device (21) connected to the wall means (13) of each said second pocket (14) on said loop conveyor (6) and facing said feed conveyor (5).

9. A device according to claim 8 in which:
- each said suction device (21) is located outside said second pocket (14), and opens on to the end of said wall means (13) facing said feed conveyor (5).

10. A device according to claim 7 in which:
- the cam push means (29) comprises means (30, 33) adjacent said feed conveyor (5) for engaging said packages (4) sequentially and continuously pushing said packages (4) gradually from the feed conveyor into respective said second pockets (14) on said loop conveyor (6) as said first pockets (27) move in said direction (8).

11. A device according to claim 10 in which:
- the cam push means (30, 33) comprises a push conveyor (30) arranged obliquely to the feed conveyor (5);
- said push conveyor (30) comprising a looped belt (31) movable about axes, perpendicular to the plane of the feed conveyor (5), and a number of brackets (33) connected to said belt (31) for gradually engaging a package (4) on the feed conveyor and pushing it into a respective first pocket (27) on the feed conveyor (5).

12. A device (1) for applying sealing strips (2) to packages (4) comprising:
- a feed conveyor (5), a loop conveyor (6) and an output conveyor (7), arranged at least partially side by side at a transfer station and adapted to travel at the same speed and in the same direction (8);
- the loop conveyor (6) being located between the feed conveyor (5) and the output conveyor (7);
- the feed conveyor (5) having a number of spaced apart first pockets (27) arranged transversely in relation to said direction (8), each first pocket (27) being designed to receive a respective said package (4);

the loop conveyor (6) having a number of spaced apart second pockets (14) arranged transversely in relation to said direction (8), each pocket (14) being designed to receive a respective said package (4);

the output conveyor (7) having a number of spaced apart third pockets (36) arranged transversely in relation to said direction (8), and each pocket (36) being designed to receive a respective said package (4);

each said second pocket (14) on the loop conveyor (6) being aligned at the transfer station with a respective third pocket (27) on the feed conveyor;

each said second pocket (14) on the loop conveyor (6) being aligned at the transfer station with a respective third pocket (36) on the output conveyor;

each pocket (14) on said loop conveyor (6) having a strip-holder means (16, 21) for holding a strip (2) in position to temporarily close an end of a respective second pocket (14) facing the feed conveyor (5);

supply means (24) for feeding a strip (2) successively to each strip-holder means (16, 21);

cam push means (29) for successively transferring a package (4) at the transfer station, transversely in relation to the direction (8), from a first said pocket (27) on the feed conveyor (5) into sealing contact with a strip (2) held across the respective loop conveyor (6) pocket (14) and into a second pocket (14) on the loop conveyor (6);

means to rotate the loop conveyor one full turn from and back to the transfer station with a sealed package (4) in a second pocket (14) of the loop conveyor (6); and means for operating the cam push means (29) for successively transferring a package (4), transversely in relation to the direction (8), from a first pocket (27) on the feed conveyor (5) into sealing contact with the strip (2) held across the respective pocket (14) of the loop conveyor (6) and into effective pushing pressure against a sealed package (4) previously positioned therein, and for simultaneously and successively pushing the previously positioned respective package (4) from a said second pocket (14) on the loop conveyor (6) to a respective said third pocket (36) on the output conveyor (7).

13. A device according to claim 12 in which:
each said first, second, and third pocket (27, 14, 36) comprises two wall means (26, 13, 35), arranged transversely in relation to said direction (8), and open at its opposite lateral ends; said strip-holder means (16, 21) comprising a suction device (21) connected to the wall means (13) of each said second pocket (14) on said loop conveyor (6) and facing said feed conveyor (5).

14. A device according to claim 13 in which:
each said suction device (21) is located outside said second pocket (14), and opens onto the end of said wall means (13) facing said feed conveyor (5).

15. A device according to claim 12 in which:
the cam push means (29) comprises means (30, 33) adjacent said feed conveyor (5) for engaging said packages (4) and sequentially and continuously pushing said packages (4) gradually from the feed conveyor into respective said second pockets (14) on said loop conveyor (6) as said first pockets (27) move in said direction (8).

16. A device according to claim 15 in which:
the cam push means (30, 33) comprises a push conveyor (30) arranged obliquely to the feed conveyor (5);

said push conveyor (30) comprising a looped belt (31) movable about axes perpendicular to the plane of the feed conveyor (5), and a number of brackets (33) connected to said belt (31) for gradually engaging a package (4) on the feed conveyor and pushing it into a respective first pocket (27) on the feed conveyor (5).

* * * * *